United States Patent
Penumatsa et al.

(10) Patent No.: US 12,450,294 B2
(45) Date of Patent: Oct. 21, 2025

(54) SELECTION OF STORAGE SERVERS BASED ON CLUSTERING BANDS

(71) Applicant: Salesforce, Inc., San Francisco, CA (US)

(72) Inventors: Vamsi Penumatsa, Bangalore (IN); Swaroop Jayanthi, Hyderabad (IN); Ramalinga Raju Kalidindi, Hyderabad (IN); Vaibhav Wadikar, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/529,965

(22) Filed: Dec. 5, 2023

(65) Prior Publication Data
US 2025/0181649 A1     Jun. 5, 2025

(51) Int. Cl.
*G06F 16/906* (2019.01)
*H04L 67/101* (2022.01)

(52) U.S. Cl.
CPC .......... *G06F 16/906* (2019.01); *H04L 67/101* (2013.01)

(58) Field of Classification Search
CPC ..... G06F 16/906; G06F 16/90; H04L 67/101; H04L 67/01
USPC ....................................................... 707/737
See application file for complete search history.

(56) References Cited

U.S. PATENT DOCUMENTS

| | | | |
|---|---|---|---|
| 7,395,537 B1 * | 7/2008 | Brown | G06F 16/217 709/200 |
| 7,693,847 B1 * | 4/2010 | Brown | G06F 9/5038 707/694 |
| 8,065,682 B2 * | 11/2011 | Baryshnikov | G06F 16/20 718/100 |
| 8,527,473 B1 * | 9/2013 | Brown | G06F 16/25 707/685 |
| 11,481,363 B2 | 10/2022 | Jayanthi et al. | |
| 11,494,202 B2 | 11/2022 | Jayanthi et al. | |
| 11,636,071 B2 | 4/2023 | Jayanthi et al. | |
| 11,683,254 B1 * | 6/2023 | Kumar | H04L 67/02 709/224 |
| 2005/0114862 A1 * | 5/2005 | Bisdikian | G06F 9/5072 718/105 |
| 2006/0026179 A1 * | 2/2006 | Brown | G06F 16/217 |
| 2008/0133608 A1 * | 6/2008 | Brown | G06F 9/5083 |
| 2008/0306950 A1 * | 12/2008 | Richards | G06F 9/505 |
| 2019/0384845 A1 * | 12/2019 | Saxena | G06F 16/24545 |
| 2020/0026563 A1 * | 1/2020 | Bahramshahry | G06F 9/4887 |
| 2021/0125007 A1 | 4/2021 | Jayanthi et al. | |
| 2021/0279112 A1 * | 9/2021 | Janakiraman | G06F 9/5083 |

* cited by examiner

*Primary Examiner* — Michael Pham
(74) *Attorney, Agent, or Firm* — Kwan & Olynick LLP

(57) ABSTRACT

In some embodiments, a method receives a request for accessing a database and selects a band from a plurality of bands for the request based on a characteristic of the request. A band is associated with a set of characteristics. The method selects a storage server for the band and determines whether the storage server can process requests from the band. When the storage server can process requests from the band, the method causes processing of the request by the storage server to access the database. When the storage server cannot process requests from the band, a traffic limiting indication is set for the storage server to limit processing of requests for the band on the storage server.

20 Claims, 9 Drawing Sheets

FIG. 2

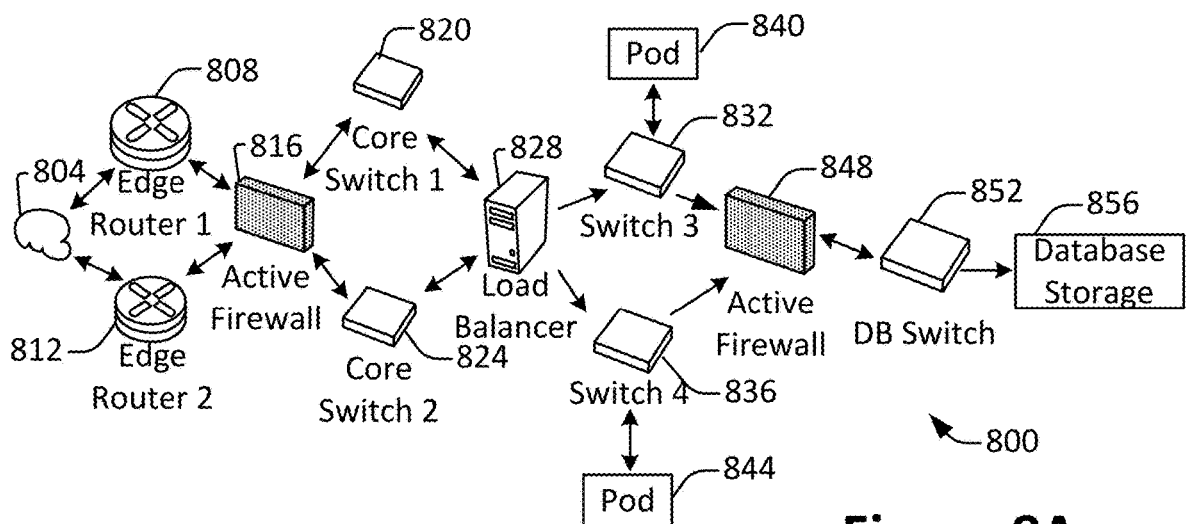
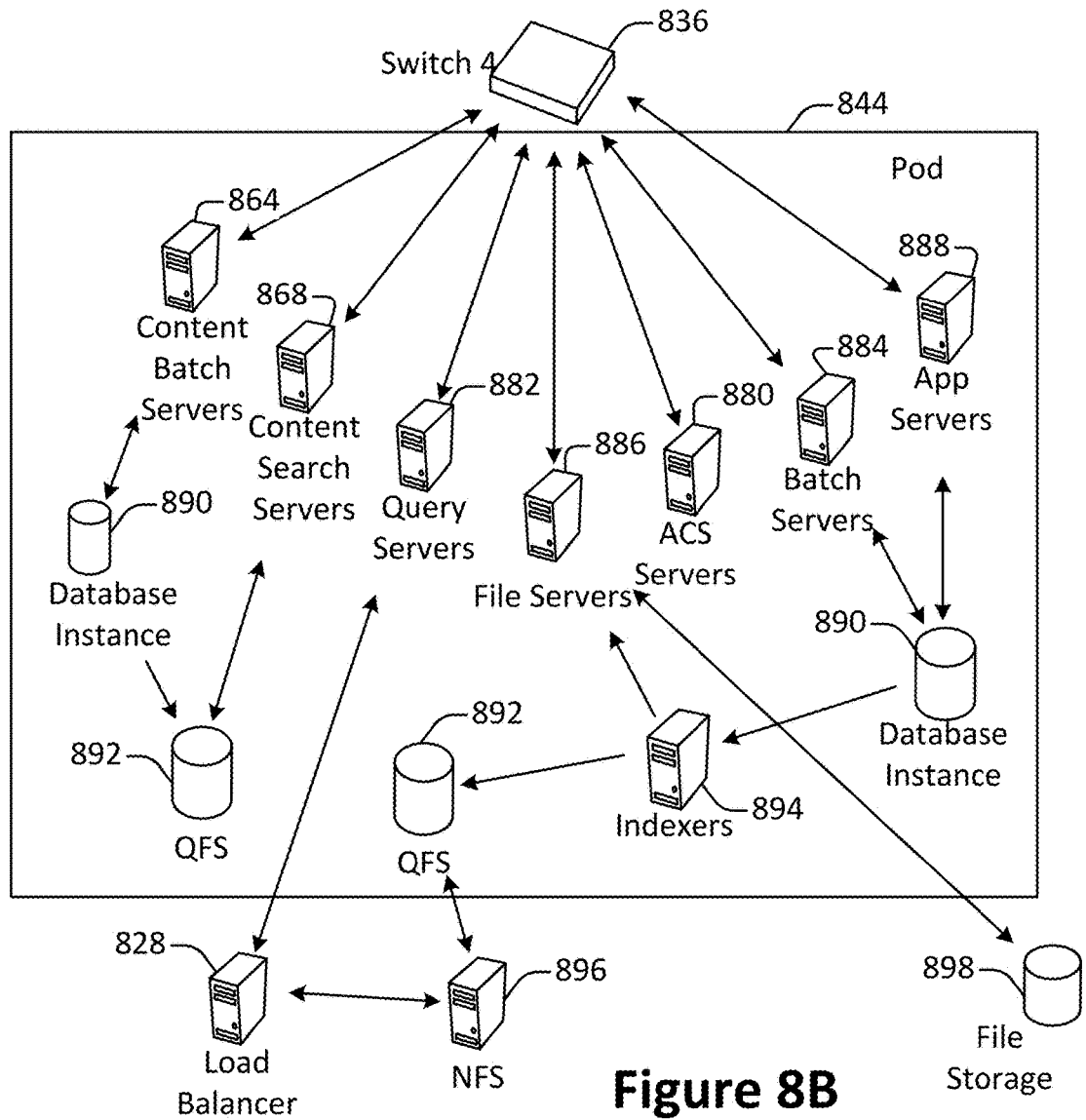
Figure 8A
Figure 8B

SELECTION OF STORAGE SERVERS BASED ON CLUSTERING BANDS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to databases and more specifically to selection of storage servers.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

A file store server may be used to process requests for a database. For example, the file store server may have threads that process requests to access files in a database, such as the requests may be read requests or write requests. The file store server may have limited resources, such as threads or memory, that can be used to process requests. If a certain percentage (or number) of threads is busy processing requests, such as 70% of the threads, then the file store server may throttle the number of requests that can be processed. For example, a traffic light may be triggered on the file store server, which may pause a current request that have been sent from an application server until the traffic light is reset. Also, any future requests from the application server may have to wait until the traffic light is reset on the file store server. For example, the percentage of requests being processed by the file store server may have to go under a certain percentage of threads before the file store server can process any new requests.

The throttling of the file store server may affect the performance of the system. For example, throttling of the file store server may not guarantee service level agreements for applications being used by customers are being met because a request that is paused may not be processed to meet the requirements. Also, if the incoming requests increase, and the application server waits until the traffic light is reset to send the requests to the file store server, the overall usage of the customer applications may be negatively affected.

BRIEF DESCRIPTION OF THE DRAWINGS

The included drawings are for illustrative purposes and serve only to provide examples of possible structures and operations for the disclosed inventive systems, apparatus, methods and computer program products for storage server selection. These drawings in no way limit any changes in form and detail that may be made by one skilled in the art without departing from the spirit and scope of the disclosed implementations.

FIG. 2 depicts an example of bands according to some embodiments.

FIG. 8A shows a system diagram of an example of architectural components of an on-demand database service environment, configured in accordance with some implementations.

FIG. 8B shows a system diagram further illustrating an example of architectural components of an on-demand database service environment, in accordance with some implementations.

DETAILED DESCRIPTION

System Overview

A system may generate bands in which requests may be classified. The bands may be associated with different dimensions of characteristics, such as size, response time, type of request, organizational characteristics, or other dimensions. When a request is received, the system may classify the request in one of the bands. Then, the system may send the request to a file store server. The file store server may determine whether a request can be processed. For example, the file store server may attempt to process the request for the band, but other methods may be used. In some embodiments, the file store server may attempt to fetch a token for the band. The token may indicate that the file store server can process a request for the band. If the token is fetched, the file store server proceeds to process the request. If the token is not fetched, the system may set a traffic light for the band. The traffic light for the band may limit the processing of requests for the band on the file store server. Then, the file store server may pause the processing of the request. The traffic light for the band may limit the processing of requests for that band on the file store server. Notably, the file store server may process requests for other bands that do not have a traffic light set.

The above process includes many advantages. For example, if one band includes a large number of smaller requests that can be processed in a short amount of time and a second band includes larger requests that take a longer amount of time, the use of the bands may improve the efficiency of processing requests. For example, if the second band has a traffic light set, the file store server can still process the requests in the first band. This may allow a large number of smaller requests to still be processed while the traffic light is set for the second band. This is an improvement over the Background where the file store server may have all requests limited when the traffic light is set. The resources of the file store server may be more efficiently used, which improves the service level performance of the file store server.

System

Figure 1:
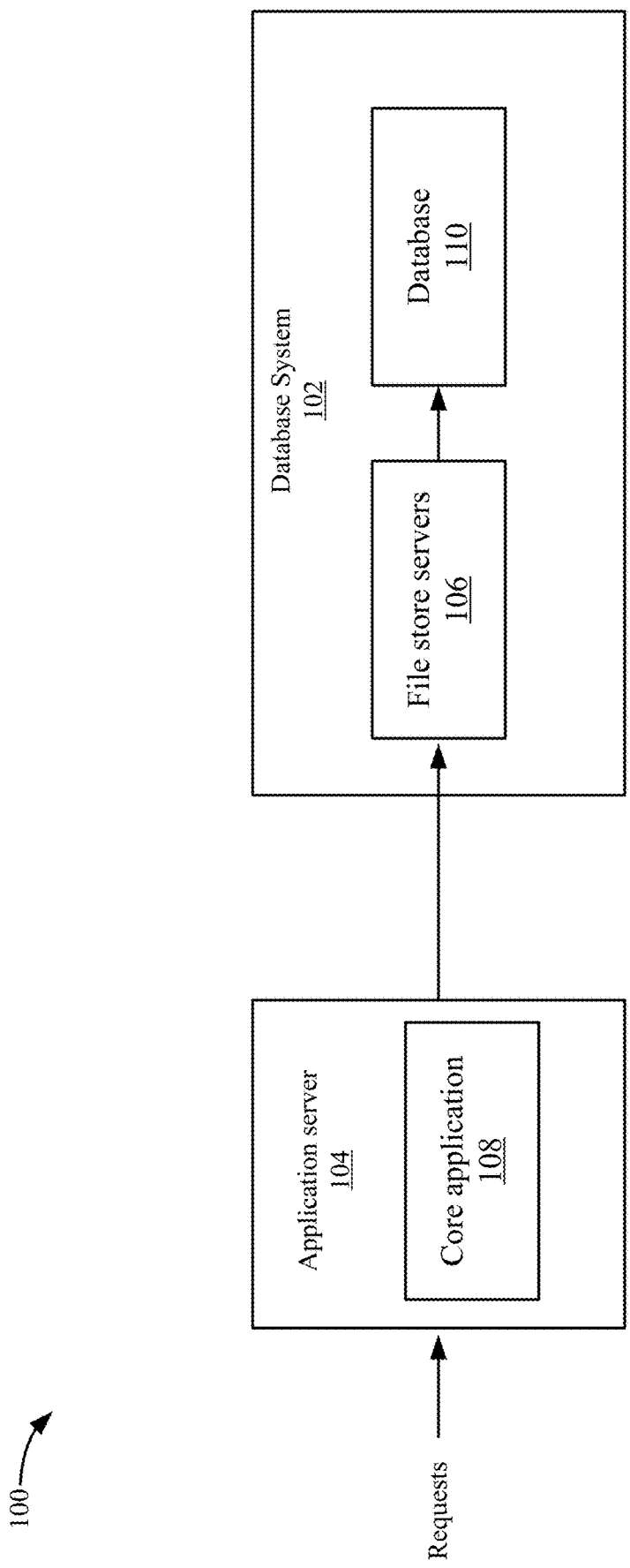
FIG. 1 depicts a simplified system for processing requests according to some embodiments.

FIG. 1 depicts a simplified system 100 for processing requests according to some embodiments. System 100 includes an application server 104 and a database system 102. Application server 104 and database system 102 may be implemented using one or more computing devices. Also, although single instance of application server 104 and database system 102 is shown, multiple instances of any component in system 100 may be appreciated. For example, there may be multiple application servers 104 and multiple database systems 102 that are processing requests from multiple consumer devices (not shown). Examples of application server 104 and database system 102 will be described in more detail below.

Application server 104 may receive requests from consumer devices for accessing database system 102. Consumer devices may be client devices that are sending the requests, but consumer devices may be other devices, such as servers. In some embodiments, a request may be for accessing files in database system 102, such as reading files stored in database system 102 or writing data to files in database system 102. Other requests may also be appreciated, such as cloning files, deleting data from files, etc.

A core application 108 in application server 104 may process the requests. Core application 108 may be an application that assigns requests to file store servers 106. Core application 108 may select a file store server 106 to process the request based on different characteristics of the request or characteristics of file store servers 106. This process will be described in more detail below.

File store servers 106 may process requests to access data in a database 110. In some embodiments, file store servers 106 serve requests to access files in database 110. File store servers 106 may have computing resources that are used to process the requests. In some embodiments, file store servers 106 include threads that can process requests. A thread may be a unit of execution that can process a request, and multiple threads may be executed in parallel to process multiple requests in parallel. In some embodiments, a single thread may process a single request to access database 110. A file store server 106 may have a number of threads, such as 520 threads, that can be used to process requests. In some embodiments, file store servers 106 may be limited in the number of requests that can be processed simultaneously. For example, 70% of the threads may be limited to being in use simultaneously.

The performance of processing the requests may be based on the use of the computing resources of file store servers 106. For example, depending on the number of threads being used or the amount of memory being used, the performance of processing of requests may vary. To improve the performance, requests are processed using bands. The requests can be classified in clusters for the bands. A cluster of requests may be queued in bands that can be processed for the band. A traffic light may still be used to indicate when file store server 106 is being limited in the processing of requests. However, the traffic light may be set for respective bands. The use of bands improves the performance of the system because requests may be more efficiently processed using the bands, such as requests in other bands may still be processed when a traffic light is set on another. Also, the requests may be more efficiently processed because the serving of requests may be based on characteristics of the requests. The bands may be associated with different performance metrics, such as band #1 may be allocated 200 threads, band #2 may be allocated 150 threads, and band #3 may be allocated 50 threads. This allocation may be optimized as needed. Previously, requests may have been processed as they were received. If some larger requests are received and processed first, then a file store server 106 may be limited for a long period until the large requests are processed. However, using the bands, the larger requests may be assigned to a band #3, and band #3 may be limited. However, a large number of requests, in band #1 may still be processed.

The following will now describe the processing of requests using bands in more detail.

Bands

Figure 2:
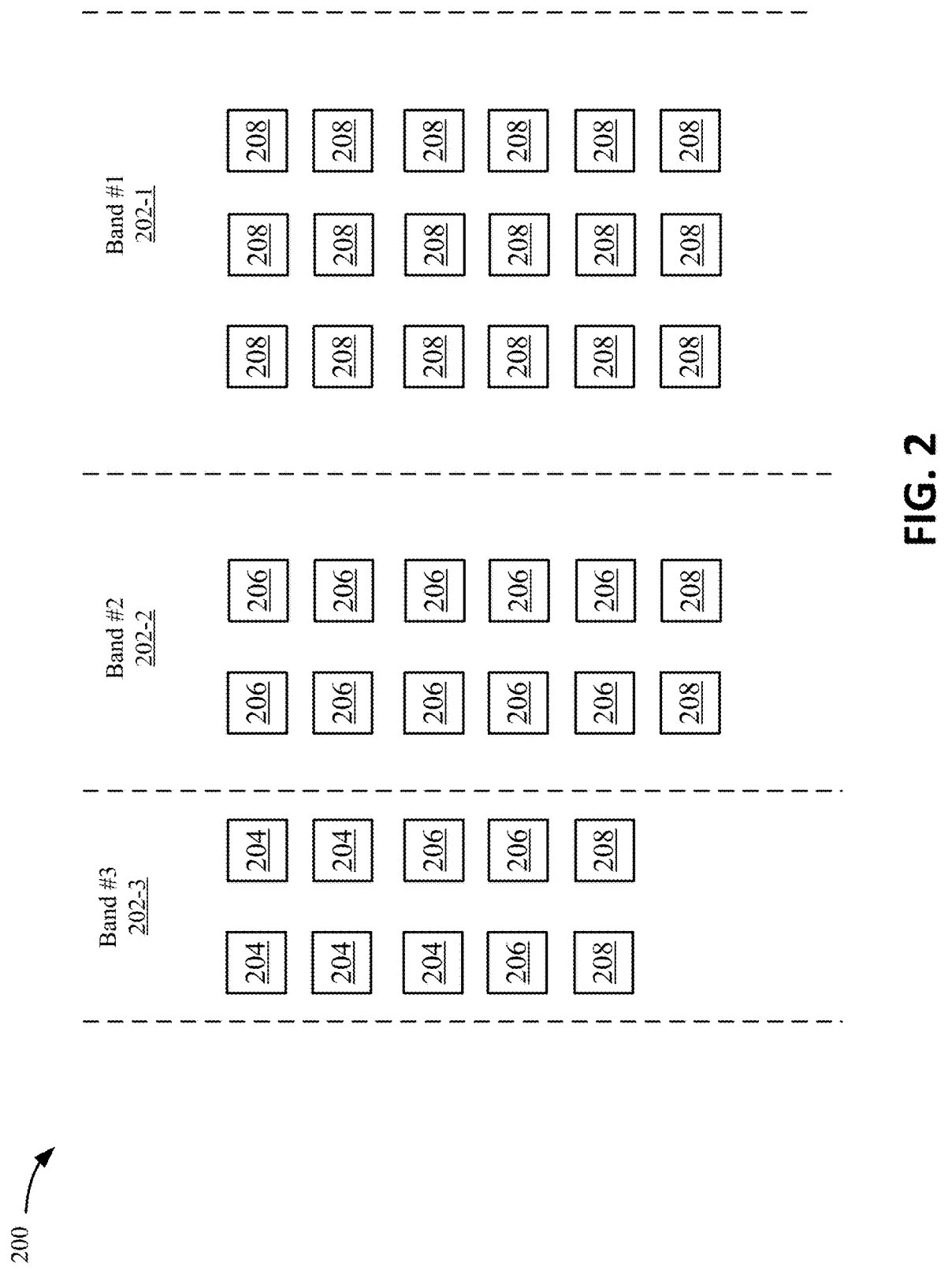

FIG. 2 depicts an example of bands according to some embodiments. Three bands, such as a band #1 202-1, a band #2 202-2, and a band #3 202-3 (collectively bands 202), are shown, but other numbers of bands may be appreciated, such as two bands, four bands, five bands, etc. Bands 202 may be associated with different characteristics. For example, the characteristics may be used to classify requests into respective bands when the characteristics of requests meet the characteristics of the band. The characteristics may be associated with dimensions, such as size, response times, type of request, organizational characteristics, etc. The size may be the number of requests or the size of the amount of data that is requested. Response times may be bandwidth used or how long it may take the request to be fulfilled. The type of request may be a read, write, clone, delete, etc. Organizational characteristics may be the organization in which the request originates or the organization of the tenant being used to send the request. As will be discussed below, a process may be used to create the bands. For example, clustering techniques cluster requests to find the clusters (e.g., bands). The bands have characteristic values from the requests that are within the cluster. The clusters (or bands) are computed during the learning phase, and then a model is generated from the clusters. The subsequent incoming requests are then evaluated with the generated model to determine the band classification. For example, when a new request is received, the system then uses the characteristic values of the bands to determine which cluster this request closely aligns to, and then assigns the band for the request.

For simplicity, requests in FIG. 2 may be classified based on size, such as a request 204 may be a large request, request 206 may be a medium request, and request 208 may be a small request. The terms small, medium, and large may be the amount of bandwidth that is used and/or the amount of time required to process the request. The classifications may be based on thresholds, such as a small request process a file under a first threshold, a large request processes a file over a third threshold, and a medium request processes a file between the first threshold and the third threshold. However, the requests may be analyzed based on multiple dimensions, not just the size of the request. For example, the characteristics may be the size and type, but can be more complex and analyze priority, tenant type, etc.

Each band 202 may be associated with computing resources. The computing resources may be an amount of computing resources that can be used to process requests for a respective band 202. For example, band #1 202-1 is shown as including a larger amount of computing resources, band #2 202-2 may be allocated a medium amount of computing resources, and band #3, 202-3 may be allocated a smaller number of computing resources. In some examples, band #1, 202-1 may be allocated 200 threads, band #2, 202-2 may be allocated 150 threads, and band #3, 202-3 may be allocated 50 threads. Although threads are described, other units of computing resources may be allocated, such as memory. The amount of computing resources may affect the processing of requests for a band 202. For example, by having 200 threads, band #1 202-1 may be configured to process more requests in parallel compared to band #3 202-3, which has 50 threads. Generally, the more computing resources a band 202 is allocated may mean the band is configured to process more requests in parallel.

Band #1 202-2 may have a queue of requests, which may be smaller requests as indicated by 18 smaller requests 208. Band #2 202-2 may have a queue of requests that may be 10 medium requests 206 and two smaller requests 208. Band #3, 202 may have a queue of requests that may be five larger requests 204, three medium requests 206, and two smaller requests 208. The assignment of requests to bands will be described in more detail below.

Band Generation

Figure 3:
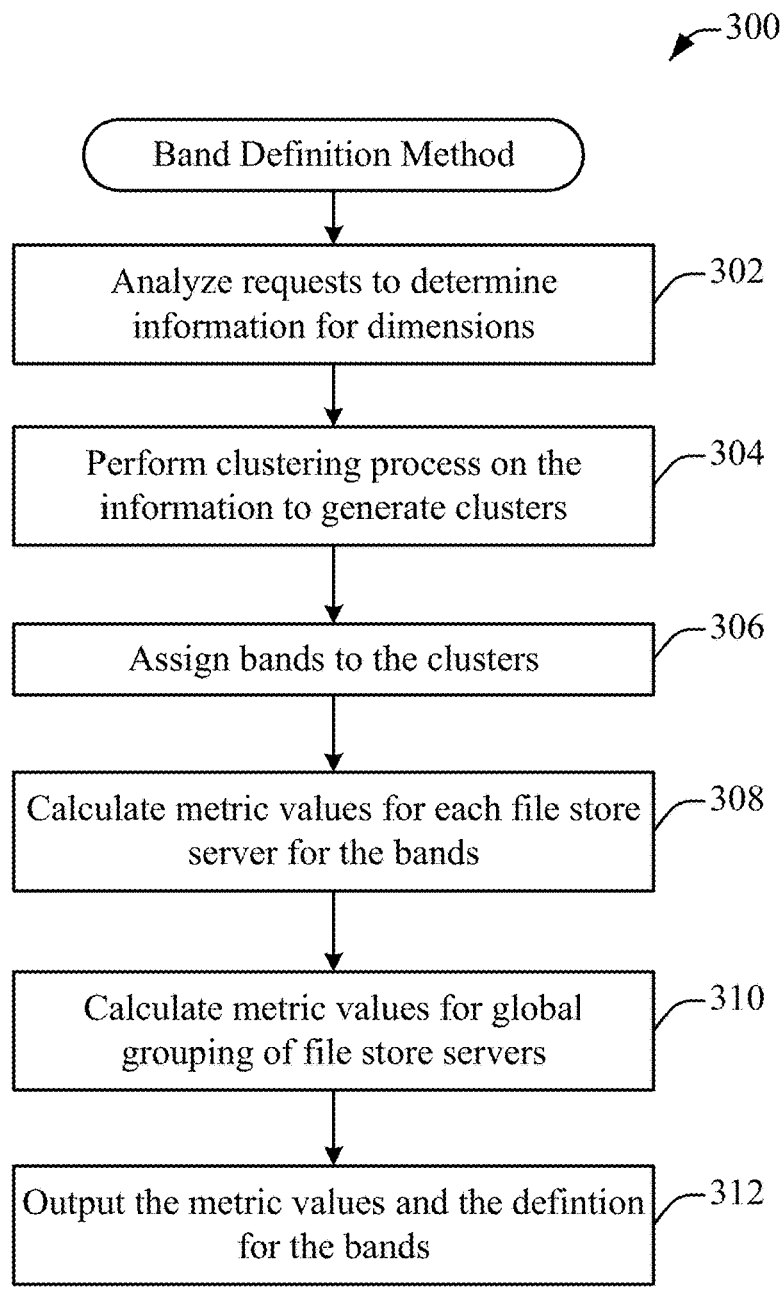
FIG. 3 depicts a simplified flow chart for determining a definition for the bands according to some embodiments.

A definition for the bands may determine the characteristics that are used to classify requests into the bands 202 and the computing resources that are assigned to the bands. FIG. 3 depicts a simplified flow chart 300 for determining a definition for the bands 202 according to some embodiments. The process may determine a band definition, which may include the characteristics of the band that may be used to classify requests into respective bands 202, the computing resources that are associated with each band, and metric values that will be used to classify requests into the bands 202. At 302, requests are analyzed to determine information for dimensions. The dimensions may include size, response time (e.g., bandwidth), type of request, organizational characteristics, etc. Values for the dimensions are determined for the requests.

At 304, system 100 performs a clustering process on the information for the dimensions to generate clusters. The clustering process that is used may be different clustering algorithms. In some embodiments, the clustering process may output a number of clusters. The number of clusters may be predefined or may be based on the characteristic values for the dimensions. For discussion purposes, three clusters may be output.

At 306, system 100 assigns bands 202 to the clusters. In some embodiments, bands may be assigned to the clusters on a one-to-one basis, such as a first cluster is assigned to a first band 202-1, a second cluster is assigned to a second band 202-2, a third cluster is assigned to a third band 202-3, etc. In other embodiments, multiple clusters may be assigned to a band 202, such as a cluster #1 and a cluster #2 may be assigned to a band #1. Also, the assignment to bands may be based on a number of bands that is desired. For example, if five clusters are generated, but only three bands 202 are desired, the clusters may be combined to form three bands 202.

At 308, system 100 calculates metric values for each file store server 106 for the bands. In some embodiments, the store average (storeAverage) for a file store server 106 for each of the bands 202 is calculated for the requests in the respective bands 202. In some embodiments, the metric may be based on a service level objective, such as bandwidth for the requests. The bandwidth may be the amount of time that is taken to process the request. At 308, system 100 calculates metric values for a global grouping of file store servers 106. For example, the global grouping may be for file store servers 106 in a data center, in multiple data centers, in portions of a data center, etc. The global averages (globalAverage) for the metric values may be calculated for each band 202. The global average globalAverage provides the near term performance of bands using bandwidth on a global scale, which is an indication of the efficiency of the global service. In some embodiments, the system 100 may calculate the global average for requests as a sliding window for the last X units of time, such as hours. A file store server average may be calculated for each band 202 in a data center for requests for the last Y units of time, such as Y days. This metric of file store server average provides the near time performance of a specific file store server. Although days for are used for file store server metrics and hours are used for global metrics, the units may be change. Hours may be used for global metrics to detect issues that may be occurring on a global basis, which may have a larger impact on performance of system 100.

Other metrics may also be computed, such as a store bias and store available capacity. A store bias (storeBias) may be a negative damping for a file store server 106 to spread requests proportionally across file store servers 106. For example, if a file store server 106 is always being selected, a store bias may be added to spread the processing of requests to other file store servers 106. The store bias may be based on a number of requests divided by a total number of requests for the last X units of time, such as X hours.

A store available capacity ratio (storeAvailableCapacityRatio) may be the amount of capacity available in a file store server 106 compared to the overall available capacity in all file store servers 106. The amount of capacity may be based on a number of threads that are available compared to a total number of threads that are available in all files store servers 106, such as in a data center.

At 310, system 100 outputs the metric values and the definition for the bands. The metric values may be used to assign the requests to the bands. The definition for the band may include the amount of computing resources (e.g., threads) that are allocated to each band. The computation of bandwidth for a band may optimize a target metric (or combination of metrics). For each of the bands, an optimization may be run at different bandwidth sizes for bands to try and optimize the metric. These metrics could be:
 1. Higher request throughput (number of requests that can be served).
 2. Lower application page time.
 3. Lower number of traffic lights triggers.

The above process may be performed and updated, such as on a continuous basis, on intervals, etc. For example, the requests that are received in the last X hours or days may be used to generate the metrics.

Request Processing

Figure 4:
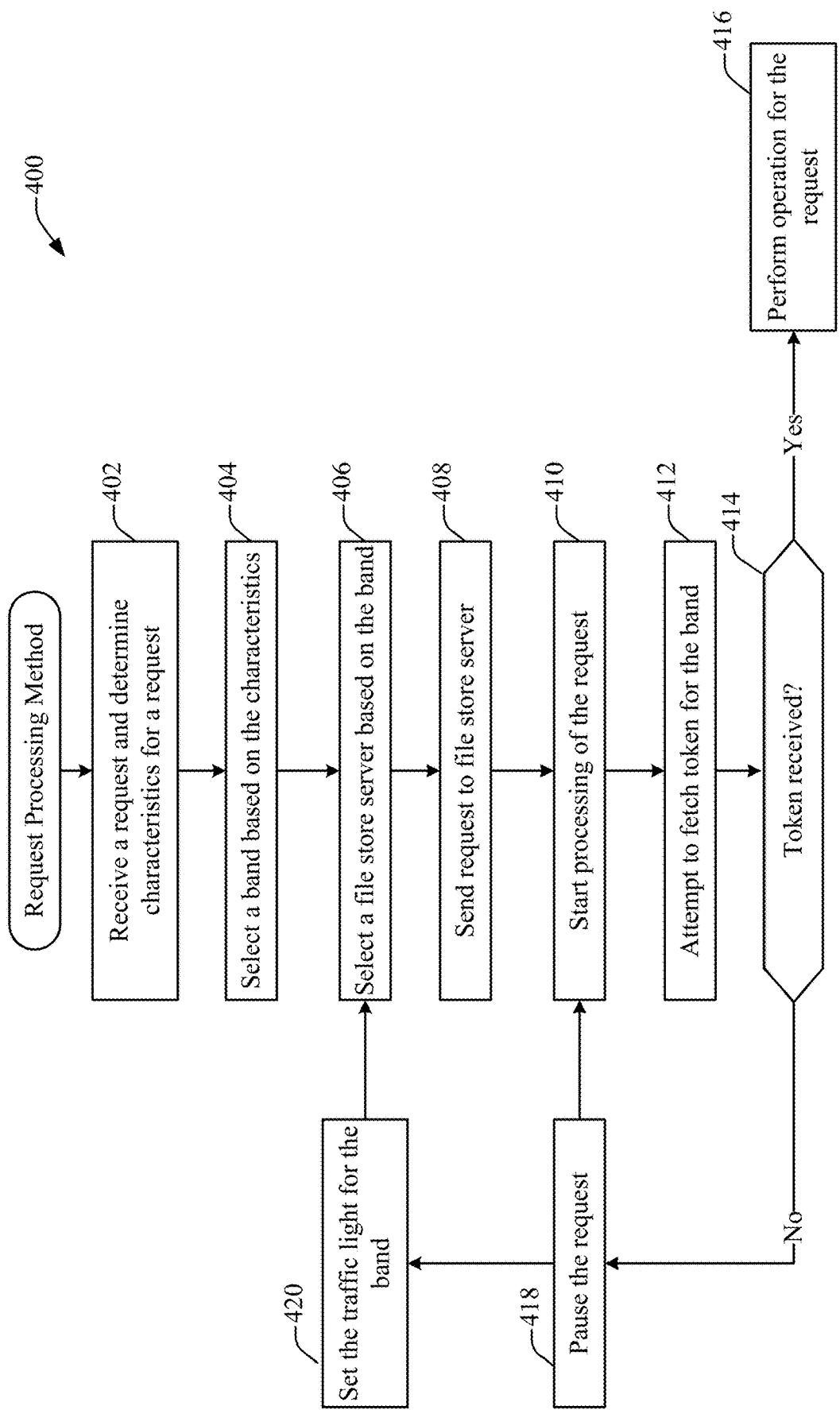
FIG. 4 depicts a simplified flowchart of a method for processing requests according to some embodiments.

Once the bands are generated, requests may be processed. FIG. 4 depicts a simplified flowchart 400 of a method for processing requests according to some embodiments. At 402, core application 108 receives a request and determines characteristics for the request. For example, a consumer device may send a request that is received at core application 108. Some examples of characteristics for the request include
 1. Size.
 2. Type (READ, WRITE, CLONE, CHECKSUM, EXISTS?, etc.).
 3. Tenant.
 4. Priority (Low, High, etc.) {data characteristic}.
 5. Caller (Customer, Backend process, etc.).

At 404, core application 108 selects a band based on the characteristics for the request. For example, core application 108 may determine characteristics for the request and determine which band has characteristics that matches the characteristics for the request. Core application 108 may compare the characteristics for the request and the characteristics for respective bands to classify a request into a band. For example, the values from the characteristics for the request are input into the model generated by the clustering process to generate the bands. Core application 108 selects the band that has characteristics closest to the characteristics of the request.

At 406, core application 108 selects a file store server 106 based on the band 202 that was selected. A file store server 106 may be selected based on the characteristics of the request, and metric values associated with file store servers 106 for the band. The selection of the file store server 106 will be discussed in more detail below.

At 408, core application 108 sends a request to the file store server 106. At 410, file store server 106 may start processing of the request. For example, file store server 106 may determine whether the request can be performed and sent to database 110 to perform the operation. A token may be used to determine whether the request can be performed, but other methods may be used. The token is returned when it is determined that file store server 106 can perform the request and not returned when the request cannot be performed. The fetching of the token may depend on certain characteristics of file store server 106, such as if there is a thread available to process the request for the band. For example, a band #1 may have 200 threads available to process requests, and if 200 threads are busy processing other requests, then a token may not be fetched. However, if there is a thread available, then a token may be fetched. Accordingly, at 412, file store server 106 attempts to fetch a token for the band. File store server 106 may send the request to a management server that determines whether tokens are issued based on current conditions at file store server 106 or in the database.

At 414, file store server 106 determines if a token is received. If a token is received, at 416, file store server 106 performs the operation for the request. For example, file store server 106 may perform a read request, a write request, or other operation with database 110.

If the token is not received, at 418, file store server 106 may pause the request. For example, file store server 106 may send a message to core application 108 that the request is being paused. At 420, file store server 106 may set a traffic light for the band. For example, the traffic light may be an indication (e.g., flag or other data) that indicates that file store server 106 is being limited in the processing of requests for the band. A traffic light may not be set for the other bands for file store server 106. Accordingly, file store server 106 may still process requests that are classified in other bands. File store server 106 may send the traffic light that is set to core application 108 or may store it such that core application 108 can see the traffic light is set when selecting a file store server 106.

The request may be processed when the traffic light is cleared. For example, the traffic light may be cleared when resources for the band are available, such as some threads become available after finishing the processing requests for the band. For example, threads may become available after requests are processed for the band or other bands. In some embodiments, the traffic light may be cleared when a certain percentage of the threads for the band become available.

The use of the bands has many advantages. For example, because the traffic light is set for the band instead of the entire file store server 106, other bands may still be used to process requests. Accordingly, large requests that may normally have caused a file store server 106 to pause processing of large number of other requests (e.g., smaller requests), may not pause the processing of requests in other bands. Also, a large burst of requests may cause a traffic light to be marked for one band, but other bands may still process requests in other bands. This improves the efficiency of the use of computing resources for file store server 106.

The following will describe different embodiments of selecting a file store server 106, such as selection processes for write requests and non-write requests. Other methods may also be used to process requests.

Figure 5:
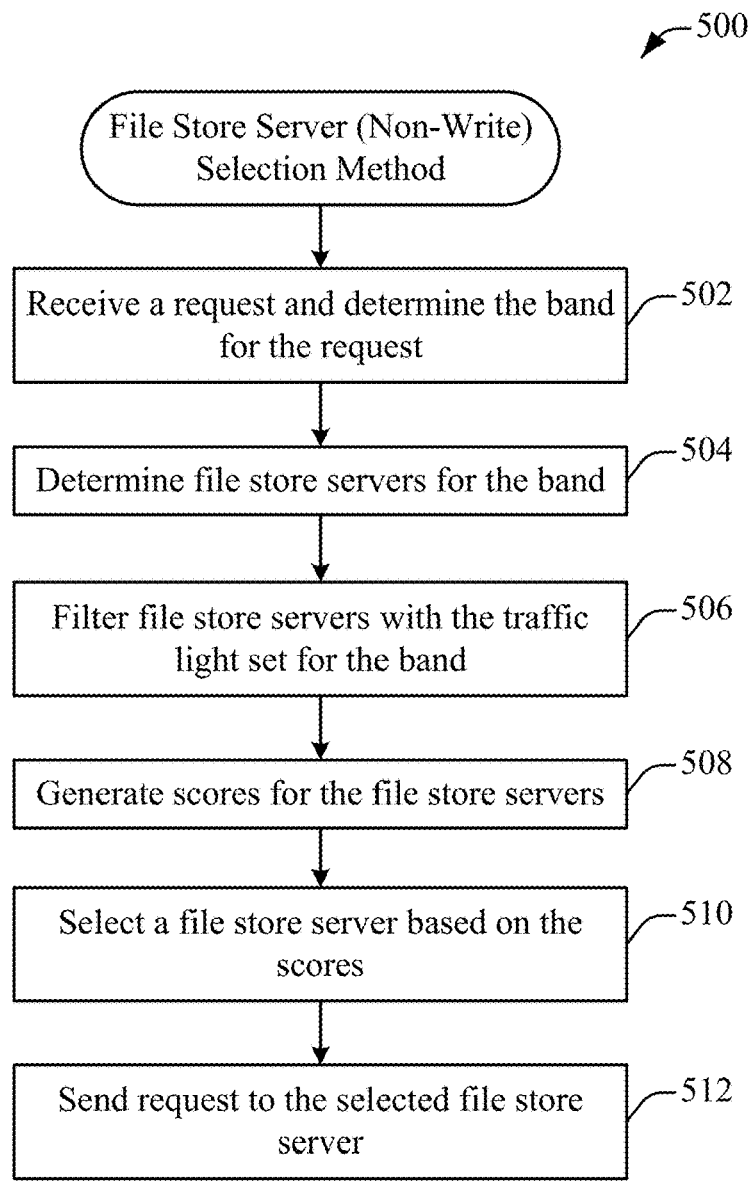
FIG. 5 depicts a simplified flowchart of a method for selecting a file store server for non-write requests according to some embodiments.

FIG. 5 depicts a simplified flowchart 500 of a method for selecting a file store server 106 for non-write requests according to some embodiments. In some embodiments, the following process may be used when a non-write request is being performed, such as a read request. At 502, a request is received and core application 108 determines a band 202 for the request. The band may be determined based on a bandwidth that is estimated to be consumed by the request or other characteristics. At 504, core application 108 determines file store servers 106 for the band 202. In some embodiments, file store servers 106 that can process the request for the band 202 are determined, such as in a data center.

At 506, core application 108 filters file store servers 106 with a traffic light set for the band 202. For example file store servers 106 may have a traffic light that is set for a first band 202, but not other bands. Only traffic lights for the band are determined.

At 508, core application 108 generates scores for the file store servers 106. The scores may be generated in different ways. For example, a score may be generated based on metrics for the band 202. Core application 108 may use the following to determine the score:

$$storeScoreForRequest = storeAverage(band) - storeBias$$

The storeAverage as described above may be an average for the last X units of processing requests, such as the bandwidth used to process the requests for the band. The store average for each of the bands may vary. The store average may be dependent on an amount of free storage space available, underlying hardware (including CPU, disk types, etc.) of the store, or other factors. In some embodiments, the store average may be different for different request types. Read requests may have a first store average and load requests may have a second store average. The storeBias is a negative damping for the file store server 106 as described above.

At 510, core application 108 selects a file store server 106 based on the scores. For example, core application 108 may rank the scores from a highest score to a lowest score. The highest score may indicate a respective files store server 106 is determined to be able to process the request with the highest performance. When selected, 512, core application 108 sends the request to the selected file store server 106.

Figure 6:
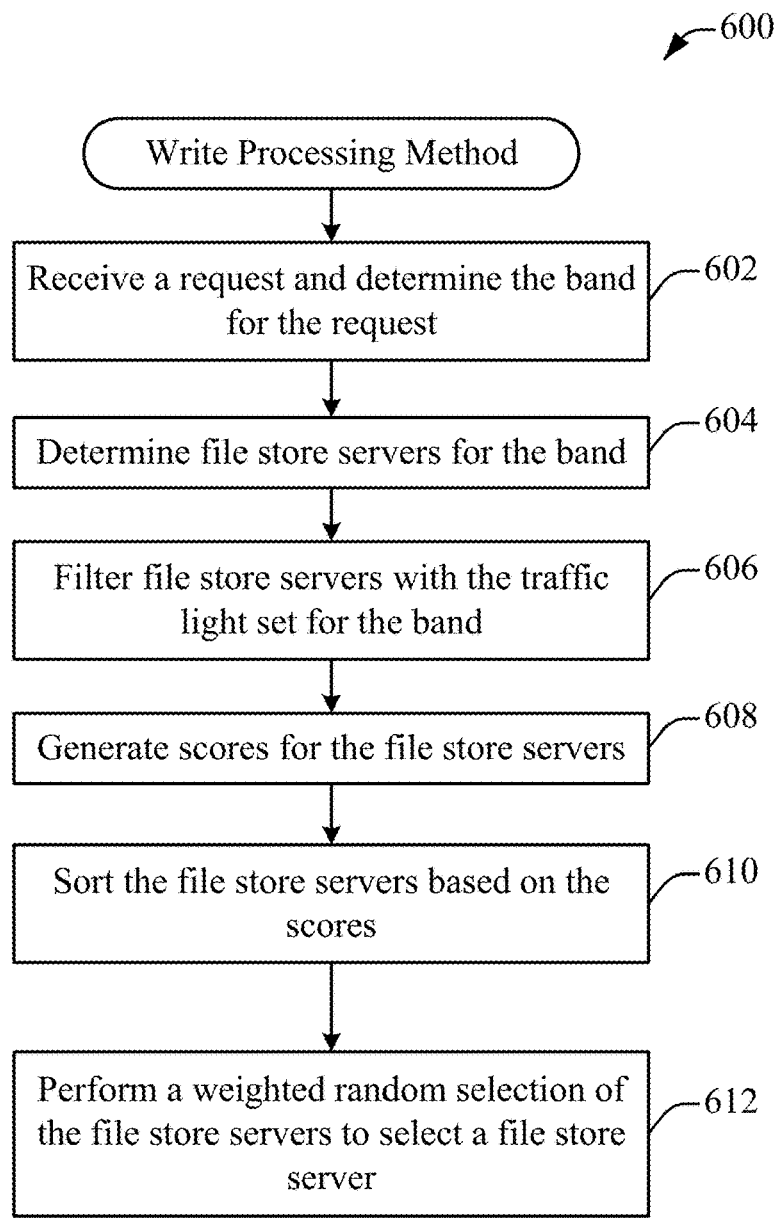
FIG. 6 depicts a second method for processing write requests according to some embodiments.

FIG. 6 depicts a second method for processing write requests according to some embodiments. In some embodiments, the method may be used to process write requests, but the method may be used to process other types of operations. At 602, core application 108 receives a request and determines a band 202 for the request. At 604, core application 108 determines file store servers 106 for the band 202. Then, at 606, core application 108 filters file store servers 106 that have a traffic light set for the band 202. The filtering removes these file store servers 106 from being selected for this request.

At 608, core application 108 generates scores for the file store servers 106. In some embodiments, the score for the file store servers 106 may be based on the global average for the band and the store average for the band. The global average may be used because, for a write request, the system should select the appropriate store for placement of data.

Here, a global average for this request type can give a heuristic on how the requests of this type performed recently. For a read request, the system may have a fixed set of destination stores that can be read to respond to the request. Here the global average does not matter since the reads are confined to only a fixed set of stores. Also, the available capacity ratio of the amount of capacity in the store compared to the overall capacity in other stores may be used. Core application 108 may use the following to determine the score for the request (storeScoreForRequest):

$$storeScoreForRequest = w1*globalAverage(band) + \\ w2*storeAverage(band) + randomError + \\ w3*storeAvailableCapacityRatio - w4*storeBias$$

The globalAverage is the global average for the band as described above. The storeAverage is the file store server average for the file store server 106 as described above. The randomError is a random error that adds an error to the calculation. The random error is used to easily sort the final list instead of using randomization of the final list. The storeAvailableCapacityRatio is an amount of capacity available in a file store server 106 compared to overall available capacity in all file store servers 106 as described above. The weights w1 ... w4 are weights computed based on optimization or preferences for processing requests. The weights may be adjusted to provide a higher request throughput, a lower average processing time, or a lower number of traffic lights that are triggered. For example, higher request throughput may be desired, and weights may be adjusted to emphasize the request throughput.

At 610, core application 108 sorts the file store servers 106 based on the scores. Then, at 612, core application 108 performs a weighted random selection of the file store servers 106 to select a file store server 106. The weighted random selection is used to spread the request across file store servers 106. In some embodiments, the random error may help when a large number of new stores (homogenous configurations) are added, and there may be very little variance in the storeAverage for the stores. Once the above score is computed, all the stores would end up returning same scores, and core application 108 may select same stores resulting in bias. In-order to mitigate this, core application 108 adds a random error, which can spread the write requests across stores. The random error can spread requests to poorly performing stores, so that the data is evenly spread. The spreading of write requests may be important, since a goal is to spread the data across the pool of stores. For other types of requests, they are mostly localized to the stores on which the data already resides.

CONCLUSION

Accordingly, requests may not be throttled for an entire file store server 106 when using the bands 202. Rather, requests may continue to be processed in other bands 202 when a traffic light is set for a band 202. This provides efficient resource use and enables the customer experience to be improved, which improves the service level availability (SLA) and the service level objective (SLO). The overall cost to serve requests may be reduced by using the resources more efficiently. Large requests may be identified and processed asynchronously to allow for smaller requests to continue to be processed. The bands 202 may also allow the understanding of performance degradation by looking at the computed metrics for the bands 202 rather than single dimensions. Also, system 100 may be benchmarked and the determination of metrics for requests of certain characteristics may be benchmarked.

Figure 7:
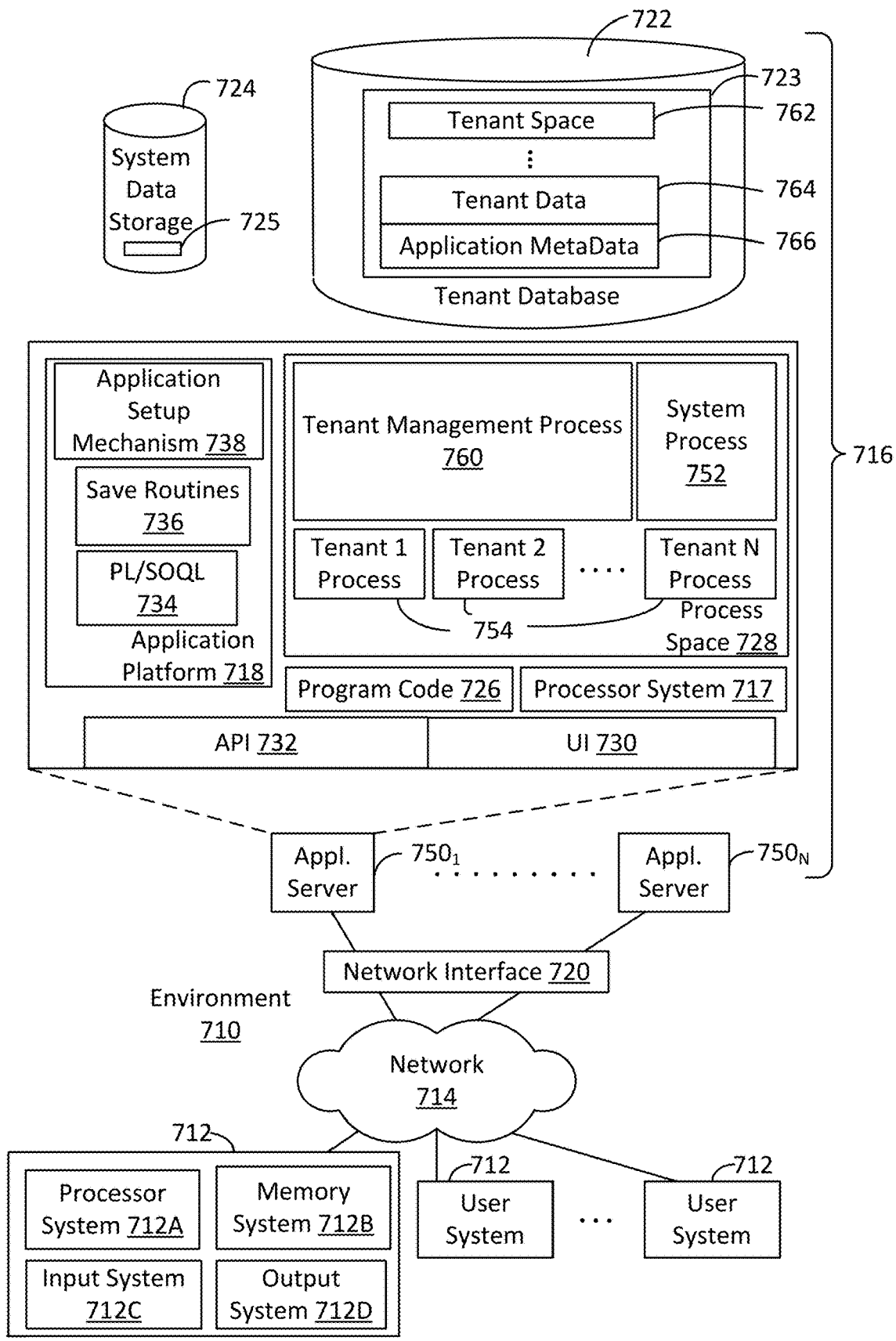
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 718 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based database system. For example, in some implementations, system 716 may include application servers configured to implement and execute database software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a file server selection system, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process file server selection information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
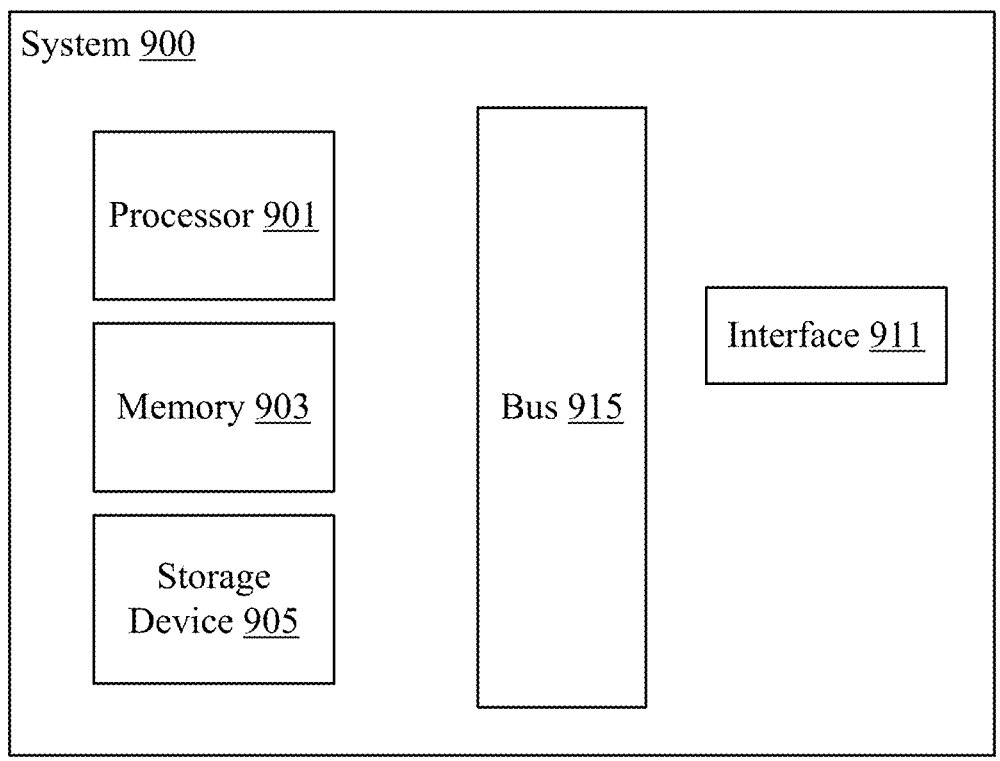
FIG. 9 illustrates one example of a computing device.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network.

Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
   receiving a request for accessing a database;
   selecting a band from a plurality of bands for the request based on a characteristic of the request, wherein a band is associated with a set of characteristics;
   selecting a storage server for the band from a plurality of storage servers, wherein a metric associated with a performance of respective storage servers processing requests for the band is used to select the storage server;
   determining whether the storage server can process requests from the band;
   when the storage server can process requests from the band, causing processing of the request by the storage server to access the database; and
   when the storage server cannot process requests from the band, setting a traffic limiting indication for the storage server to limit processing of requests for the band on the storage server, wherein the storage server is still able to process requests for other bands in the plurality of bands that do not have a traffic limiting indication set.

2. The method of claim 1, wherein bands in the plurality of bands are associated with different sets of characteristics.

3. The method of claim 1, wherein selecting the band comprises:
   comparing the set of characteristics for the band to the characteristic for the request to select the band.

4. The method of claim 1, wherein selecting the band comprises:
   comparing different sets of characteristics for bands in the plurality of bands to corresponding characteristics for the request; and
   classifying the request in the band based on the comparing.

5. The method of claim 1, further comprising:
   generating the plurality of bands based on clustering previous requests into a plurality of clusters.

6. The method of claim 5, wherein values for a set of characteristics of the plurality of clusters are used to determine the set of characteristics for the plurality of bands.

7. The method of claim 1, wherein selecting the storage server comprises:
   ranking a plurality of storage servers for the band based on the metric; and
   selecting the storage server from the ranking of storage servers.

8. The method of claim 7, further comprising:
   filtering storage servers that have the traffic limiting indication set for the band that is selected for the request to form the plurality of storage servers.

9. The method of claim 7, wherein ranking the plurality of storage servers comprises:
   calculating a plurality of scores for the metric based on performance of respective storage servers processing requests for the band; and
   ranking the plurality of scores.

10. The method of claim 9, wherein calculating the plurality of scores comprises:
    applying a respective bias for respective storage servers in the calculating of the plurality of scores.

11. The method of claim 9, wherein calculating the plurality of scores comprises:
    performing a weighted random selection of the storage servers.

12. The method of claim 9, wherein calculating the plurality of scores comprises:
    calculating the plurality of scores for the metric based on a first metric for processing of requests in the band and a second metric for respective storage servers in the plurality of storage servers on processing requests in the band.

13. The method of claim 12, wherein the first metric and the second metric are weighted.

14. The method of claim 12, wherein calculating the plurality of scores comprises:
calculating the plurality of scores for the metric based on a third metric for respective bias for respective storage servers in the plurality of storage servers.

15. The method of claim 12, wherein calculating the plurality of scores comprises:
calculating the plurality of scores for the metric based on a third metric for respective capacity to process requests for respective storage servers in the plurality of storage servers.

16. The method of claim 1, wherein determining whether the storage server can process requests from the band comprises:
attempting to fetch a token that indicates the storage server can process the request for the band, wherein the storage server can process the request when the token is fetched.

17. The method of claim 1, wherein the indication is a traffic light that is set for the storage server.

18. A non-transitory computer-readable storage medium having stored thereon computer executable instructions, which when executed by a computing device, cause the computing device to be configurable to cause:
receiving a request for accessing a database;
selecting a band from a plurality of bands for the request based on a characteristic of the request, wherein a band is associated with a set of characteristics;
selecting a storage server for the band from a plurality of storage servers, wherein a metric associated with a performance of respective storage servers processing requests for the band is used to select the storage server;
determining whether the storage server can process requests from the band;
when the storage server can process requests from the band, causing processing of the request by the storage server to access the database; and
when the storage server cannot process requests from the band, setting a traffic limiting indication for the storage server to limit processing of requests for the band on the storage server, wherein the storage server is still able to process requests for other bands in the plurality of bands that do not have a traffic limiting indication set.

19. The non-transitory computer-readable storage medium of claim 18, wherein selecting the storage server comprises:
ranking a plurality of storage servers for the band based on the metric; and
selecting the storage server from the ranking of storage servers.

20. An apparatus comprising:
one or more computer processors; and
a computer-readable storage medium comprising instructions for controlling the one or more computer processors to be configurable to cause:
receiving a request for accessing a database;
selecting a band from a plurality of bands for the request based on a characteristic of the request, wherein a band is associated with a set of characteristics;
selecting a storage server for the band from a plurality of storage servers, wherein a metric associated with a performance of respective storage servers processing requests for the band is used to select the storage server;
determining whether the storage server can process requests from the band;
when the storage server can process requests from the band, causing processing of the request by the storage server to access the database; and
when the storage server cannot process requests from the band, setting a traffic limiting indication for the storage server to limit processing of requests for the band on the storage server, wherein the storage server is still able to process requests for other bands in the plurality of bands that do not have a traffic limiting indication set.

* * * * *